(12) United States Patent
Byun et al.

(10) Patent No.: US 11,718,712 B2
(45) Date of Patent: Aug. 8, 2023

(54) COMPOSITION FOR INTERFACIAL POLYMERIZATION OF POLYAMIDE AND MANUFACTURING METHOD FOR WATER TREATMENT SEPARATION MEMBRANE USING SAME

(71) Applicant: LG CHEM, LTD., Seoul (KR)

(72) Inventors: Eunkyoung Byun, Daejeon (KR); Youngju Lee, Daejeon (KR); Lakwon Choi, Daejeon (KR); Chong Kyu Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 525 days.

(21) Appl. No.: 16/756,652

(22) PCT Filed: Jun. 20, 2019

(86) PCT No.: PCT/KR2019/007438
§ 371 (c)(1),
(2) Date: Apr. 16, 2020

(87) PCT Pub. No.: WO2019/245296
PCT Pub. Date: Dec. 26, 2019

(65) Prior Publication Data
US 2020/0332059 A1  Oct. 22, 2020

(30) Foreign Application Priority Data

Jun. 20, 2018 (KR) .................. 10-2018-0070933
Jun. 20, 2018 (KR) .................. 10-2018-0070938
Jun. 20, 2018 (KR) .................. 10-2018-0070940

(51) Int. Cl.
*C08G 69/44* (2006.01)
*C08G 69/04* (2006.01)
(Continued)

(52) U.S. Cl.
CPC .......... *C08G 69/04* (2013.01); *B01D 61/025* (2013.01); *B01D 67/0006* (2013.01);
(Continued)

(58) Field of Classification Search
CPC .... C08F 2400/00; C08F 2400/02; C08F 2/00; C08F 2/02; C08G 63/99; C08G 69/44;
(Continued)

(56) References Cited

U.S. PATENT DOCUMENTS 4,676,645 A * 6/1987 Taniguchi ................ G01D 5/38
                                                      250/237 G
2015/0017856 A1  1/2015 Davis et al.
(Continued)

FOREIGN PATENT DOCUMENTS

CN  101244367  8/2008
CN  107735166  2/2018
(Continued)

OTHER PUBLICATIONS

Chen et al., "Synthesis and characterization of novel polyamides containing purine moiety," Polymer-Plastics Technology and Engineering 57(13):1325-1333 (2018).
(Continued)

*Primary Examiner* — Allison G Fitzsimmons
(74) *Attorney, Agent, or Firm* — Dentons US LLP

(57) ABSTRACT

Provided is a composition for interfacial polymerizing polyamide including an amine compound; and one or more types of compounds selected from among a purine-based compound and a pyrimidine-based compound of Chemical Formula 1:
(Continued)

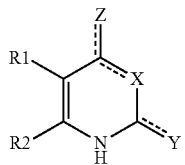

[Chemical Formula 1]

wherein, in Chemical Formula 1:
X is N or NH;
Y is O or OH;
Z is O, OH or $NH_2$;
R1 and R2 are each hydrogen or a substituted or unsubstituted alkyl group; and
▬ ▬ ▬ ▬ ▬ is a single bond or a double bond,
and a method for manufacturing a water-treatment membrane and a water-treatment membrane using the same.

4 Claims, 1 Drawing Sheet

(51) Int. Cl.
- B01D 61/02 (2006.01)
- B01D 67/00 (2006.01)
- B01D 69/10 (2006.01)
- B01D 71/56 (2006.01)
- C02F 1/44 (2023.01)
- C09D 177/10 (2006.01)
- B01D 69/00 (2006.01)

(52) U.S. Cl.
CPC ............. B01D 69/10 (2013.01); B01D 71/56 (2013.01); C02F 1/441 (2013.01); C09D 177/10 (2013.01); B01D 2323/36 (2013.01); C02F 2305/04 (2013.01)

(58) Field of Classification Search
CPC ........ C08G 73/00; B01D 63/00; B01D 63/08; B01D 63/087; B01D 67/00; B01D 67/0002; B01D 67/0006; B01D 67/0009; B01D 67/0013; B01D 67/0016; B01D 67/0018; B01D 67/0023; B01D 67/0079; B01D 67/0081; B01D 69/00; B01D 69/02; B01D 69/06; B01D 6/10; B01D 69/106; B01D 69/107; B01D 69/12; B01D 69/125; B01D 69/1251; B01D 71/00; B01D 71/06; B01D 71/58; B01D 71/60; B01D 71/62; B01D 2323/00; B01D 2323/30; B01D 2323/40
USPC .................................................... 210/500.38
See application file for complete search history.

(56) References Cited

U.S. PATENT DOCUMENTS

2015/0136688 A1 5/2015 Moon et al.
2018/0178170 A1 6/2018 Lee et al.

FOREIGN PATENT DOCUMENTS

| EP | 1958685 A1 | 8/2008 |
|---|---|---|
| JP | H119978 | 1/1999 |
| KR | 10-19990019008 | 3/1999 |
| KR | 10-2000-0031681 | 6/2000 |
| KR | 100477587 | 7/2005 |
| KR | 10-0781625 | 12/2007 |
| KR | 10-20080075765 | 8/2008 |
| KR | 10-20150057093 | 5/2015 |
| KR | 10-20170112564 | 10/2017 |

OTHER PUBLICATIONS

Chen et al., "Synthesis and Characterization of Novel Polyamides Containing Purine Moiety," Polymer-Plastics Technology and Engineering 57(13):1325-1333 (2018), published online Jan. 3, 2018 (pp. 1-30).

* cited by examiner

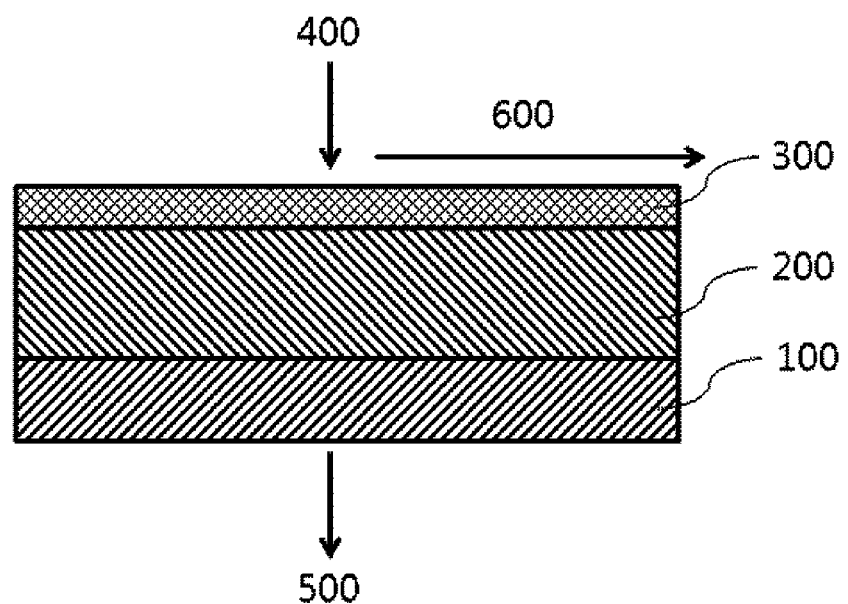

COMPOSITION FOR INTERFACIAL POLYMERIZATION OF POLYAMIDE AND MANUFACTURING METHOD FOR WATER TREATMENT SEPARATION MEMBRANE USING SAME

CROSS-REFERENCE TO RELATED APPLICATIONS

This application is a National Stage Application of International Application No. PCT/KR2019/007438 filed on Jun. 20, 2019, which claims priority to and the benefits of Korean Patent Application Nos. 10-2018-0070933, 10-2018-0070940 and 10-2018-0070938 filed with the Korean Intellectual Property Office on Jun. 20, 2018, the entire contents of which are incorporated herein by reference.

TECHNICAL FIELD

The present specification relates to a composition for interfacial polymerizing polyamide, and a method for manufacturing a water-treatment membrane using the same.

BACKGROUND

A phenomenon that a solvent moves from, between two solutions separated by a semi-permeable membrane, a solution with a low solute concentration to a solution with a high solute concentration through the membrane is referred to as an osmosis phenomenon, and herein, a pressure working on the side of the solution with a high solute concentration due to the solvent migration is referred to as an osmotic pressure. However, when applying an external pressure higher than an osmotic pressure, the solvent moves toward the solution with a low solute concentration, and this phenomenon is referred to as reverse osmosis. Using a reverse osmosis principle, various salts or organic substances can be separated through a semi-permeable membrane with a pressure gradient as a driving force. A water-treatment membrane using such a reverse osmosis phenomenon has been used to supply water for household, construction and industry after separating substances at a molecular level and removing salts from salt water or sea water.

Typical examples of such a water-treatment membrane can include a polyamide-based water-treatment membrane, and the polyamide-based water-treatment membrane is manufactured using a method of forming a polyamide active layer on a microporous support. More specifically, the polyamide-based water-treatment membrane is manufactured using a method of forming a polysulfone layer on a non-woven fabric to form a microporous support, dipping this microporous support into an aqueous m-phenylenediamine (hereinafter, mPD) solution to form an mPD layer, and dipping this again into an organic trimesoyl chloride (TMC) solvent, bringing the mPD layer into contact with the TMC, and interfacial polymerizing the result to form a polyamide layer.

In the water-treatment membrane, salt rejection is used as an important indicator representing membrane performance.

BRIEF DESCRIPTION

Technical Problem

The present specification is directed to providing a composition for interfacial polymerizing polyamide, and a method for manufacturing a water-treatment membrane using the same.

Technical Solution

One embodiment of the present specification provides a composition for interfacial polymerizing polyamide including
an amine compound; and
one or more types of compounds selected from among a purine-based compound and a pyrimidine-based compound of Chemical Formula 1:

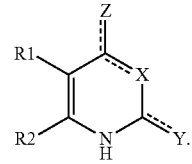

Chemical Formula 1

In Chemical Formula 1:
X is N or NH;
Y is O or OH;
Z is O, OH or $NH_2$;
R1 and R2 are each hydrogen or a substituted or unsubstituted alkyl group; and ┄┄┄ is a single bond or a double bond.

Another embodiment of the present specification provides a method for manufacturing a water-treatment membrane including
preparing a porous support, and
forming a polyamide active layer on the porous support by interfacial polymerizing the composition for interfacial polymerizing polyamide and an acyl halide compound.

Another embodiment of the present specification provides a water-treatment membrane including a porous support;
and a polyamide active layer provided on the porous support,
and including one or more types selected from among a purine-based compound and a pyrimidine-based compound of Chemical Formula 1.

Another embodiment of the present specification provides a water-treatment module including one or more of the water-treatment membranes.

Advantageous Effects

Manufacturing a water-treatment membrane using a composition for interfacial polymerizing polyamide according to one embodiment of the present specification is effective in enhancing salt rejection since pyrimidine-based and/or purine-based base nitrogen is stably present through a bond in the membrane.

DESCRIPTION OF DRAWINGS

FIG. 1 illustrates a water-treatment membrane according to one embodiment of the present specification.

REFERENCE NUMERALS

100: Non-Woven Fabric
200: Porous Support Layer
300: Polyamide Active Layer
400: Raw Water Including Impurities
500: Purified Water
600: Concentrated Water

DETAILED DESCRIPTION

Hereinafter, the present specification will be described in more detail.

One embodiment of the present specification provides a composition for interfacial polymerizing polyamide including an amine compound; and one or more types of compounds selected from among a purine-based compound and a pyrimidine-based compound of Chemical Formula 1:

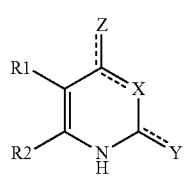

Chemical Formula 1 wherein in Chemical Formula 1:
X is N or NH;
Y is O or OH;
Z is O, OH or $NH_2$;
R1 and R2 are each hydrogen or a substituted or unsubstituted alkyl group; and ▬▬▬ is a single bond or a double bond.

When preparing a polyamide active layer using the composition for interfacial polymerizing polyamide according to the present disclosure, surface energy can be controlled during interfacial polymerization, and by a terminal functional group of the pyrimidine-based compound and/or the purine-based compound and a functional group of TMC, a main monomer of the interfacial polymerization, forming a covalent bond, pyrimidine-based or purine-based base nitrogen is stably present, and as a result, performance of a water-treatment membrane can be enhanced.

In addition, when the Y position in Chemical Formula 1 is O or OH, a hydrogen bond is induced, which has an advantage of increasing a flow rate.

Meanwhile, an amino acid substance such as tryptophan or tyrosine has nitrogen present in a $NH_3^+$ form by an adjacent carboxyl group, and is difficult to form a covalent bond since reactivity with a TMC functional group greatly decreases, and in addition thereto, there are no functional groups capable of inducing a hydrogen bond, and an effect of increasing a flow rate is difficult to be achieved.

In the present specification, a description of a certain member being placed "on" another member includes not only a case of the certain member adjoining the another member but a case of still another member being present between the two members.

In the present specification, a description of a certain part "including" certain constituents means capable of further including other constituents, and does not exclude other constituents unless particularly stated on the contrary.

In the present specification, the alkyl group can be linear or branched, and although not particularly limited thereto, the number of carbon atoms is preferably from 1 to 50. Specific examples thereof can include methyl, ethyl, propyl, n-propyl, isopropyl, butyl, n-butyl, isobutyl, tert-butyl, sec-butyl, 1-methylbutyl, 1-ethylbutyl, pentyl, n-pentyl, isopentyl, neopentyl, tert-pentyl, hexyl, n-hexyl, 1-methyl-pentyl, 2-methylpentyl, 4-methyl-2-pentyl, 3,3-dimethyl-butyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylhexyl, 4-methylhexyl, 5-methylhexyl and the like, but are not limited thereto.

In the present specification, the term "substituted or unsubstituted" means being substituted with one, two or more substituents selected from the group consisting of deuterium, a halogen group, a nitrile group, a nitro group, a hydroxy group, a carbonyl group, an ester group, an imide group, an amino group, a silyl group, an amine group, a phosphine oxide group, an alkyl group, a cycloalkyl group, an alkenyl group, an alkoxy group, an alkylthio group, an aryl group, a sulfonyl group and a heterocyclic group, being substituted with a substituent linking two or more substituents among the substituents illustrated above, or having no substituents.

In the present specification, ▬▬▬ means being selected from among a single bond or a double bond.

In one embodiment of the present specification, the pyrimidine-based compound includes one or more groups selected from among a carbonyl group and a hydroxy group.

In one embodiment of the present specification, the pyrimidine-based compound includes a carbonyl group.

In one embodiment of the present specification, the pyrimidine-based compound includes a hydroxy group.

In one embodiment of the present specification, X is N, Y is O, and Z is $NH_2$.

In one embodiment of the present specification, X is NH, Y is O, and Z is O.

In one embodiment of the present specification, R1 and R2 are each hydrogen or a linear alkyl group having 1 to 5 carbon atoms.

In one embodiment of the present specification, R1 is a methyl group, and R2 is hydrogen.

In one embodiment of the present specification, R1 and R2 are each hydrogen.

In one embodiment of the present specification, the pyrimidine-based compound can be one of the following Chemical Formula 2-1 or 2-2:

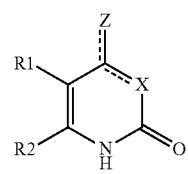

Chemical Formula 2-1

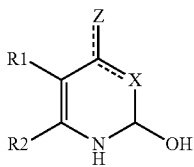

Chemical Formula 2-2

In Chemical Formulae 2-1 and 2-2,
X, Z, R1 and R2 have the same definitions as in Chemical Formula 1.

In one embodiment of the present specification, the pyrimidine-based compound can be one of the following Chemical Formula 3-1 or 3-2:

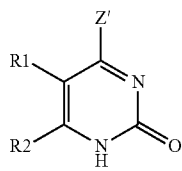

Chemical Formula 3-1

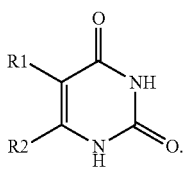

Chemical Formula 3-2

In Chemical Formulae 3-1 and 3-2:

Z' is OH or NH$_2$;

R1 and R2 are each hydrogen or a substituted or unsubstituted alkyl group.

In one embodiment of the present specification, the pyrimidine-based compound is one or more selected from among uracil, cytosine and thymine.

In one embodiment of the present specification, the pyrimidine-based compound is uracil.

In one embodiment of the present specification, the pyrimidine-based compound is a pH-dependent tautomer, and can include a carbonyl group or a hydroxy group.

In one embodiment of the present specification, the composition for interfacial polymerizing polyamide includes the pyrimidine-based compound of Chemical Formula 1, and the amount of the pyrimidine-based compound present is from 0.001 wt % to 1 wt %, preferably from 0.001 wt % to 0.5 wt %, and more preferably from 0.005 wt % to 0.1 wt % based on 100 wt % of the composition for interfacial polymerizing polyamide.

When the pyrimidine-based compound is included in an amount of 0.001 wt % or greater, an effect of increasing salt rejection obtained by the pyrimidine-based compound addition is sufficiently obtained, and including the pyrimidine-based compound in an amount of 1 wt % or less can prevent flux that is in a trade-off relationship with salt rejection from excessively decreasing.

In one embodiment of the present specification, the purine-based compound is one or more selected from among purine, adenine, guanine, hypoxanthine, xanthine, theobromine, caffeine, uric acid and isoguanine.

In one embodiment of the present specification, the purine-based compound is guanine. Guanine includes a primary amine, and is thereby highly reactive with monomers during interfacial polymerization, and since secondary modification is readily conducted, guanine is most effective in enhancing performance of a water-treatment membrane.

In one embodiment of the present specification, the composition for interfacial polymerizing polyamide includes the purine-based compound, and the amount of the purine-based compound present is from 0.001 wt % to 1 wt %, preferably from 0.001 wt % to 0.5 wt %, and more preferably from 0.005 wt % to 0.1 wt % based on 100 wt % of the composition for interfacial polymerizing polyamide.

When the purine-based compound is included in an amount of 0.001 wt % or greater, an effect of increasing salt rejection obtained by the purine-based compound addition is sufficiently obtained, and including the purine-based compound in an amount of 1 wt % or less can prevent flux that is in a trade-off relationship with salt rejection from excessively decreasing.

In one embodiment of the present specification, the composition for interfacial polymerizing polyamide includes the purine-based compound and the pyrimidine-based compound of Chemical Formula 1, and the total amount of the purine-based compound and the pyrimidine-based compound is from 0.01 wt % to 0.2 wt %, preferably from 0.015 wt % to 0.15 wt %, and more preferably from 0.06 wt % to 0.11 wt % based on 100 wt % of the composition for interfacial polymerizing polyamide.

Using the pyrimidine-based compound and the purine-based compound together has an advantage of more stably securing salt rejection compared to when using each of these alone.

In one embodiment of the present specification, the pyrimidine-based compound is uracil, and the purine-based compound is guanine.

In one embodiment of the present specification, the pyrimidine-based compound is uracil, and the purine-based compound is xanthine.

In one embodiment of the present specification, the pyrimidine-based compound is cytosine, and the purine-based compound is guanine.

In one embodiment of the present specification, the pyrimidine-based compound is thymine, and the purine-based compound is guanine.

In one embodiment of the present specification, the amine compound is not limited as long as it can be used in polyamide polymerization, however, examples thereof can include m-phenylenediamine (mPD), p-phenylenediamine (PPD), 1,3,6-benzenetriamine (TAB), 4-chloro-1,3-phenylenediamine, 6-chloro-1,3-phenylenediamine, 3-chloro-1,4-phenylenediamine or mixtures thereof, and preferably, the amine compound can be m-phenylenediamine (mPD).

In one embodiment of the present specification, the amount of the amine compound can be from 0.1 wt % to 20 wt %, preferably from 1 wt % to 15 wt %, and more preferably from 3 wt % to 10 wt % based on 100 wt % of the composition for interfacial polymerizing polyamide.

When the amine compound content is in the above-mentioned range, a uniform polyamide layer can be prepared.

In one embodiment of the present specification, the composition for interfacial polymerizing polyamide can further include a surfactant.

When interfacial polymerizing the polyamide active layer, polyamide is quickly formed at an interface of an aqueous solution layer and an organic solution layer, and herein, the surfactant makes the layer thin and uniform so that the amine compound present in the aqueous solution layer readily migrates to the organic solution layer to form a uniform polyamide active layer.

In one embodiment of the present specification, the surfactant can be selected from among nonionic, cationic, anionic and amphoteric surfactants. According to one embodiment of the present specification, the surfactant can be selected from among sodium lauryl sulphate (SLS), alkyl ether sulphates, alkyl sulphates, olefin sulfonates, alkyl ether carboxylates, sulfosuccinates, aromatic sulfonates, octylphenol ethoxylates, ethoxylated nonylphenols, alkyl poly(ethylene oxide), copolymers of poly(ethylene oxide) and poly(propylene oxide), alkyl polyglucosides such as octyl glucoside and decyl maltoside, aliphatic acid alcohols such as cetyl alcohol, oleyl alcohol, cocamide MEA, cocamide DEA, alkyl hydroxyethyldimethylammonium chloride, cetyltrimethyl-ammonium bromide, cetyltrimethylammonium chloride, hexadecyltrimethylammonium bromide and hexadecyl-trimethylammonium chloride, and alkyl betaines. Specifically, the surfactant can be SLS, octylphenol ethoxylates or ethoxylated nonylphenols.

Particularly, when using sodium lauryl sulphate (SLS) as the surfactant, the SLS is highly soluble in water due to its high affinity for water and oil (hydrophile-lipophile balance, HLB), and by having a high critical micelle concentration (CMC), formation of the polyamide active layer is not inhibited even when added in excess.

In one embodiment of the present specification, the content of the surfactant can be from 0.01 wt % to 1 wt % based on 100 wt % of the composition for interfacial polymerizing polyamide.

In one embodiment of the present specification, the composition for interfacial polymerizing polyamide can include water as a solvent, and the remainder excluding the amine compound, the pyrimidine-based compound, the purine-based compound and the surfactant in the composition can all be water.

One embodiment of the present specification provides a method for manufacturing a water-treatment membrane including preparing a porous support; and forming a polyamide active layer on the porous support by interfacial polymerizing the composition for interfacial polymerizing polyamide and an acyl halide compound.

In one embodiment of the present specification, the preparing of a porous support can be conducted by coating a polymer material on a non-woven fabric, and type, thickness and porosity of the non-woven fabric can diversely vary as necessary.

Examples of the polymer material can include polysulfone, polyethersulfone, polycarbonate, polyethylene oxide, polyimide, polyetherimide, polyetheretherketone, polypropylene, polymethyl-pentene, polymethyl chloride, polyvinylidene fluoride and the like, but are not limited thereto.

In one embodiment of the present specification, the polymer material can be polysulfone.

In one embodiment of the present specification, the forming of a polyamide active layer can include forming an aqueous solution layer including the composition for interfacial polymerizing polyamide on the porous support; and bringing an organic solution including an acyl halide compound and an organic solvent into contact with the aqueous solution layer thereon.

When bringing the organic solution into contact with the aqueous solution layer including the composition for interfacial polymerizing polyamide, polyamide is produced by interfacial polymerization while the amine compound coated on the porous support surface and the acyl halide compound react, and the polyamide is adsorbed on the microporous support to form a thin film. As a method of the contact, a method of dipping, spraying, coating or the like can be used.

In one embodiment of the present specification, a method for forming the aqueous solution layer including the composition for interfacial polymerizing polyamide on the porous support is not particularly limited, and methods capable of forming an aqueous solution layer on a support can be used without limit. Specifically, spraying, coating, dipping, dropping or the like can be used.

In one embodiment of the present specification, the aqueous solution layer can further go through removing an excess amine compound-including aqueous solution as necessary. The aqueous solution layer formed on the porous support can be non-uniformly distributed when there is too much of the aqueous solution present on the support, and when the aqueous solution is non-uniformly distributed, a non-uniform polyamide active layer can be formed by subsequent interfacial polymerization. Accordingly, the excess aqueous solution is preferably removed after forming the aqueous solution layer on the support. A method of removing the excess aqueous solution is not particularly limited, however, methods using a sponge, an air knife, nitrogen gas blowing, natural drying, a compression roll or the like can be used.

The acyl halide compound is not limited as long as it can be used in polyamide polymerization, however, an aromatic compound having 2 or 3 carboxylic acid halides, for example, one type selected from the compound group consisting of trimesoyl chloride (TMC), isophthaloyl chloride and terephthaloyl chloride, or a mixture of two or more types thereof can be preferably used, and preferably, trimesoyl chloride (TMC) can be used.

In one embodiment of the present specification, the organic solvent preferably does not participate in an interfacial polymerization reaction, and an aliphatic hydrocarbon solvent, for example, one or more types selected from among freons, an alkane having 5 to 12 carbon atoms, and isoparaffin-based solvents, an alkane mixture material, can be included. Specifically, one or more types selected from among hexane, heptane, octane, nonane, decane, undecane, dodecane, cyclohexane, IsoPar (Exxon), IsoPar G (Exxon), ISOL-C (SK Chem) and ISOL-G (Exxon) can be used, however, the organic solvent is not limited thereto.

The amount of the acyl halide compound can be from 0.05 wt % to 1 wt %, preferably from 0.08 wt % to 0.8 wt %, and more preferably from 0.05 wt % to 0.6 wt % based on 100 wt % of the organic solution.

A uniform polyamide layer can be prepared when the acyl halide compound amount is in the above-mentioned range.

One embodiment of the present specification provides a water-treatment membrane including a porous support; and a polyamide active layer provided on the porous support, and including one or more types selected from among a purine-based compound and a pyrimidine-based compound of Chemical Formula 1.

In one embodiment of the present specification, the water-treatment membrane has salt rejection of 99% or greater, preferably 99.5% or greater, and more preferably 99.6% or greater.

The salt rejection is based on a value measured when passing through an aqueous solution containing 2,000 ppm of NaCl for 60 minutes with a pressure of 150 psi and a flow rate of 4.5 L/min at 25° C.

For each constitution of the water-treatment membrane, descriptions on the composition for interfacial polymerizing polyamide and the method for manufacturing a water-treatment membrane described above can apply.

FIG. 1 illustrates a water-treatment membrane according to one embodiment of the present specification. Specifically, FIG. 1 illustrates a water-treatment membrane in which a non-woven fabric (100), a porous support layer (200) and a polyamide active layer (300) are consecutively provided, and as raw water including impurities (400) flows into the polyamide active layer (300), purified water (500) is discharged through the non-woven fabric (100), and concentrated water (600) is discharged outside failing to pass through the polyamide active layer (300). However, structures of the water-treatment membrane according to one embodiment of the present specification are not limited to the structure of FIG. 1, and additional configurations can be further included.

In one embodiment of the present specification, the water-treatment membrane can be a microfiltration membrane, an ultrafiltration membrane, a nanofiltration membrane, or a reverse osmosis membrane, and can specifically be a reverse osmosis membrane.

One embodiment of the present disclosure provides a water-treatment module including one or more of the water-treatment membranes described above.

Specific types of the water-treatment module are not particularly limited, and examples thereof can include a plate & frame module, a tubular module, a hollow fiber module, a spiral wound module, or the like. In addition, as long as the water-treatment module includes the reverse osmosis membrane according to one embodiment of the present specification described above, the water-treatment module is not particularly limited in other constitutions and manufacturing methods, and general means known in the art can be employed without limit.

Meanwhile, the water-treatment module according to one embodiment of the present specification has excellent salt rejection, and therefore, is useful in water-treatment systems such as household/industrial water-purification systems, sewage treatment systems, or sea to fresh water treatment systems.

Hereinafter, the present specification will be described in detail with reference to examples in order to specifically describe the present specification. However, examples according to the present specification can be modified to various different forms, and the scope of the present specification is not construed as being limited to the examples described below. The examples of the present specification are provided in order to more fully describe the present specification to those having average knowledge in the art.

EXAMPLE: MANUFACTURE OF WATER-TREATMENT MEMBRANE

Comparative Example 1

18 wt % of a polysulfone solid was introduced to an N,N-dimethylformamide (DMF) solution and dissolved for 12 hours or longer at 80° C. to 85° C. to obtain a uniform liquid phase. This solution was cast to a thickness of 150 µm on a non-woven fabric made of a polyester material and having a thickness of 95 µm to 100 µm. Then, the cast non-woven fabric was placed in water to prepare a porous polysulfone support having porosity of 70%.

On the support, an aqueous solution layer was formed by coating a composition for interfacial polymerizing polyamide including, based on 100 wt % of the composition, 8 wt % of m-phenylenediamine (mPD), 0.06 wt % of sodium lauryl sulphate (SLS) as a surfactant, and the remainder water.

Subsequently, an organic solution including 0.25 wt % of trimesoyl chloride (TMC) and 99.75 wt % of Isopar-G was coated on the aqueous solution layer to form an organic layer, and the result was interfacial polymerized to form a polyamide active layer, and as a result, a water-treatment membrane was manufactured.

Example 1

A water-treatment membrane was manufactured in the same manner as in Comparative Example 1 except that 0.005 wt % of uracil was added to the composition for interfacial polymerizing polyamide.

Example 2

A water-treatment membrane was manufactured in the same manner as in Comparative Example 1 except that 0.01 wt % of uracil was added to the composition for interfacial polymerizing polyamide.

Example 3

A water-treatment membrane was manufactured in the same manner as in Comparative Example 1 except that 0.05 wt % of uracil was added to the composition for interfacial polymerizing polyamide.

Example 4

A water-treatment membrane was manufactured in the same manner as in Comparative Example 1 except that 0.1 wt % of uracil was added to the composition for interfacial polymerizing polyamide.

Example 5

A water-treatment membrane was manufactured in the same manner as in Comparative Example 1 except that 0.05 wt % of cytosine was added to the composition for interfacial polymerizing polyamide.

Example 6

A water-treatment membrane was manufactured in the same manner as in Comparative Example 1 except that 0.05 wt % of thymine was added to the composition for interfacial polymerizing polyamide.

Example 7

A water-treatment membrane was manufactured in the same manner as in Comparative Example 1 except that 0.005 wt % of guanine was added to the composition for interfacial polymerizing polyamide.

Example 8

A water-treatment membrane was manufactured in the same manner as in Comparative Example 1 except that 0.01 wt % of guanine was added to the composition for interfacial polymerizing polyamide.

Example 9

A water-treatment membrane was manufactured in the same manner as in Comparative Example 1 except that 0.1 wt % of guanine was added to the composition for interfacial polymerizing polyamide.

Example 10

A water-treatment membrane was manufactured in the same manner as in Example 2 except that xanthine was used instead of guanine.

Example 11

A water-treatment membrane was manufactured in the same manner as in Comparative Example 1 except that 0.005 wt % of uracil and 0.01 wt % of guanine were added to the composition for interfacial polymerizing polyamide.

Example 12

A water-treatment membrane was manufactured in the same manner as in Comparative Example 1 except that 0.01 wt % of uracil and 0.01 wt % of guanine were added to the composition for interfacial polymerizing polyamide.

Example 13

A water-treatment membrane was manufactured in the same manner as in Comparative Example 1 except that 0.05 wt % of uracil and 0.01 wt % of guanine were added to the composition for interfacial polymerizing polyamide.

Example 14

A water-treatment membrane was manufactured in the same manner as in Comparative Example 1 except that 0.1 wt % of uracil and 0.01 wt % of guanine were added to the composition for interfacial polymerizing polyamide.

Example 15

A water-treatment membrane was manufactured in the same manner as in Comparative Example 1 except that 0.05 wt % of uracil and 0.005 wt % of guanine were added to the composition for interfacial polymerizing polyamide.

Example 16

A water-treatment membrane was manufactured in the same manner as in Comparative Example 1 except that 0.05 wt % of uracil and 0.05 wt % of guanine were added to the composition for interfacial polymerizing polyamide.

Example 17

A water-treatment membrane was manufactured in the same manner as in Comparative Example 1 except that 0.05 wt % of uracil and 0.1 wt % of guanine were added to the composition for interfacial polymerizing polyamide.

Example 18

A water-treatment membrane was manufactured in the same manner as in Comparative Example 1 except that 0.05 wt % of uracil and 0.01 wt % of xanthine were added to the composition for interfacial polymerizing polyamide.

Example 19

A water-treatment membrane was manufactured in the same manner as in Comparative Example 1 except that 0.05 wt % of cytosine and 0.01 wt % of guanine were added to the composition for interfacial polymerizing polyamide.

Example 20

A water-treatment membrane was manufactured in the same manner as in Comparative Example 1 except that 0.05 wt % of thymine and 0.01 wt % of guanine were added to the composition for interfacial polymerizing polyamide.

EXPERIMENTAL EXAMPLE: PERFORMANCE EVALUATION ON WATER-TREATMENT MEMBRANE

In order to measure salt rejection and flux (GFD) of the water-treatment membranes manufactured according to the examples and the comparative example, a water-treatment module formed including a flat-plate permeation cell, a high-pressure pump, a storage tank and a cooling device was used. The flat-plate permeation cell was a cross-flow type and had an effective permeation area of 28 cm$^2$. After installing the water-treatment membrane on the permeation cell, a sufficient preliminary operation was performed for approximately 1 hour using tertiary distilled water for device stabilization.

After that, device stabilization was confirmed by operating the device for approximately 1 hour using 2,000 ppm of an aqueous NaCl solution with 150 psi and a flow rate of 4.5 L/min, and then flux (GFD, gallon/ft$^2$/day) was calculated by measuring the amount of water permeated for 10 minutes at 25° C., and salt concentrations before and after the permeation were analyzed using a conductivity meter to calculate salt rejection. The results are as shown in the following Table 1.

TABLE 1

| | Type of Pyrimidine-Based Compound | Content of Pyrimidine-Based Compound (wt %) | Type of Purine-Based Compound | Content of Purine-Based Compound (wt %) | Salt Rejection (%) | Flux (GFD) |
|---|---|---|---|---|---|---|
| Comparative Example 1 | — | 0 | — | 0 | 99.44 | 17.12 |
| Example 1 | Uracil | 0.005 | — | 0 | 99.62 | 17.53 |
| Example 2 | Uracil | 0.01 | — | 0 | 99.75 | 16.15 |
| Example 3 | Uracil | 0.05 | — | 0 | 99.73 | 17.92 |
| Example 4 | Uracil | 0.1 | — | 0 | 99.67 | 14.64 |
| Example 5 | Cytosine | 0.05 | — | 0 | 99.71 | 18.13 |
| Example 6 | Thymine | 0.05 | — | 0 | 99.73 | 17.66 |
| Example 7 | — | 0 | Guanine | 0.005 | 99.76 | 13.90 |
| Example 8 | — | 0 | Guanine | 0.01 | 99.74 | 12.91 |
| Example 9 | — | 0 | Guanine | 0.1 | 99.77 | 12.99 |
| Example 10 | — | 0 | Xanthine | 0.01 | 99.68 | 15.26 |
| Example 11 | Uracil | 0.005 | Guanine | 0.01 | 99.64 | 15.07 |
| Example 12 | Uracil | 0.01 | Guanine | 0.01 | 99.62 | 15.43 |
| Example 13 | Uracil | 0.05 | Guanine | 0.01 | 99.7 | 17.53 |
| Example 14 | Uracil | 0.1 | Guanine | 0.01 | 99.72 | 15.13 |
| Example 15 | Uracil | 0.05 | Guanine | 0.005 | 99.6 | 16.61 |
| Example 16 | Uracil | 0.05 | Guanine | 0.05 | 99.58 | 15.71 |

TABLE 1-continued

|  | Type of Pyrimidine-Based Compound | Content of Pyrimidine-Based Compound (wt %) | Type of Purine-Based Compound | Content of Purine-Based Compound (wt %) | Salt Rejection (%) | Flux (GFD) |
|---|---|---|---|---|---|---|
| Example 17 | Uracil | 0.05 | Guanine | 0.1 | 99.65 | 15.34 |
| Example 18 | Uracil | 0.05 | Xanthine | 0.01 | 99.62 | 15.60 |
| Example 19 | Cytosine | 0.05 | Guanine | 0.01 | 99.66 | 17.60 |
| Example 20 | Thymine | 0.05 | Guanine | 0.01 | 99.69 | 17.11 |

From the results of Table 1, it was identified that the water-treatment membranes of Examples 1 to 20 that include one or more types of a purine-based compound and a pyrimidine-based compound of Chemical Formula 1 according to one embodiment of the present specification had significantly higher salt rejection compared to the water-treatment membrane of Comparative Example 1 that does not include a purine-based compound and a pyrimidine-based compound.

Specifically, it was identified that the water-treatment membranes of Examples 1 to 20 had salt rejection of 99.5% or greater and preferably 99.6% or greater, whereas the water-treatment membrane of Comparative Example 1 did not.

In other words, it was proved that manufacturing a water-treatment membrane using the composition for interfacial polymerizing polyamide according to one embodiment of the present specification is effective in enhancing salt rejection without significantly decreasing flux.

The invention claimed is:
1. A composition for interfacial polymerizing polyamide comprising:
   an amine compound; and
   one or more types of compounds selected from among a purine-based compound and a pyrimidine-based compound,
   wherein the purine-based compound is one or more selected from among purine, adenine, guanine, hypoxanthine, xanthine, theobromine, caffeine, uric acid and isoguanine,
   wherein the pyrimidine-based compound is one or more selected from among uracil, cytosine and thymine,
   wherein the purine-based compound is present in an amount from 0.001 wt % to 1 wt % based on 100 wt % of the composition,
   wherein the pyrimidine-based compound is present in an amount from 0.001 wt % to 1 wt % based on 100 wt % of the composition; and
   wherein, when the composition is contacted with an organic solution containing an acyl halide, an interfacial polymerization forms a polyamide active layer.

2. The composition of claim 1 comprising the purine-based compound and the pyrimidine-based compound, wherein a total amount of the purine-based compound and the pyrimidine-based compound is from 0.01 wt % to 0.2 wt % based on 100 wt % of the composition.

3. The composition of claim 1, wherein the amine compound is present in an amount from 0.1 wt % to 20 wt % based on 100 wt % of the composition.

4. The composition claim 1, further comprising a surfactant, wherein the surfactant is present in an amount from 0.01 wt % to 1 wt % based on 100 wt % of the composition.

* * * * *